(12) United States Patent
Brown et al.

(10) Patent No.: US 7,293,175 B2
(45) Date of Patent: Nov. 6, 2007

(54) AUTOMATIC INFORMATION SANITIZER

(75) Inventors: Larry Brown, Lone Tree, CO (US);
Thomas Marso, Parker, CO (US);
Russell Savage, Parker, CO (US)

(73) Assignee: Lockheed Martin Corporation,
Bethesda, MD (US)

( * ) Notice: Subject to any disclaimer, the term of this patent is extended or adjusted under 35 U.S.C. 154(b) by 781 days.

(21) Appl. No.: 09/895,801

(22) Filed: Jun. 29, 2001

(65) Prior Publication Data
US 2002/0073313 A1    Jun. 13, 2002

Related U.S. Application Data

(60) Provisional application No. 60/215,114, filed on Jun. 29, 2000.

(51) Int. Cl.
*H04L 9/00* (2006.01)

(52) U.S. Cl. .......................................... 713/166; 726/27
(58) Field of Classification Search ................ 713/200, 713/169, 152, 166; 726/27; 380/252
See application file for complete search history.

(56) References Cited

U.S. PATENT DOCUMENTS

| | | | | |
|---|---|---|---|---|
| 4,882,752 A | * | 11/1989 | Lindman et al. ............ 713/166 |
| 5,355,474 A | * | 10/1994 | Thuraisngham et al. ........ 707/9 |
| 5,872,847 A | * | 2/1999 | Boyle et al. ................. 713/151 |
| 5,960,080 A | * | 9/1999 | Fahlman et al. ............. 380/252 |
| 6,304,973 B1 | * | 10/2001 | Williams ..................... 713/201 |
| 6,678,822 B1 | * | 1/2004 | Morar et al. ................. 713/182 |

* cited by examiner

*Primary Examiner*—Emmanuel L. Moise
*Assistant Examiner*—Ali S. Abyaneh
(74) *Attorney, Agent, or Firm*—Marsh Fischmann & Breyfogle LLP

(57) ABSTRACT

An automatic data sanitizer module sanitizes formatted data from an external source system according to stored sanitization rules for release to an external destination system so that the destination system receives only that data for which it is authorized. The module generally includes an Input Comms module, a Message Processor, an Output Guard a Downgrader and an Output Comms module. The Input Comms module supports the communications protocol dictated by the external source system. The Processor sanitizes the message according to the rules written for the specific external system under consideration. The Guard verifies the modifications performed by the Processor. The Downgrader moves the resulting file to the Output Comms working directory and the Output Comms makes the resulting message available to the destination system. The system supports a variety of different formats and greatly facilitates the timely dissemination of information within a multi-level secure environment while protecting security interests.

10 Claims, 14 Drawing Sheets

AUTOMATIC INFORMATION SANITIZER

CROSS REFERENCE TO RELATED APPLICATION

This application is a continuation-in-part of U.S. Provisional Patent Application No. 60/215,114, filed on Jun. 29, 2000, (the "Parent Application") which is incorporated herein by reference.

FIELD OF THE INVENTION

The present invention relates in general to a computer-based utility for screening transmitted information and, in particular, to such a utility for automatically sanitizing transmitted messages based on stored sanitation rules. The invention has particular advantages for use in Multi-Level Secure (MLS) environments for reliably and quickly disseminating information to multiple destinations associated with different security clearances or access authorizations (collectively "clearances").

BACKGROUND OF THE INVENTION

In a variety of contexts, it is desirable to sanitize transmitted electronic messages. Such sanitization involves selectively removing or otherwise blocking or rendering unintelligible sensitive subject-matter of the messages. This is generally implemented based on sanitation rules that identify the sensitive subject matter and establish access/distribution rules based on, for example, the identity of the potential recipients, the classification affiliation or other status of potential recipients, the locations or nationalities of potential end users, or other criteria.

The case of distributing information in an MLS system is illustrative. Generally, an MLS system defines multiple levels of clearance. Each level is associated with its own rules regarding subject matter to which access may be provided. For example, in the context of selectively distributing protected images and military asset information, particular subject matter may be designated as "secret", "top secret", "no foreign nationals", etc.

Conventionally, the associated rules are executed manually. However, such manual execution has limitations related to timeliness and consistency. With regard to timeliness, it is often desired to selectively share information in contexts where timeliness of dissemination is critical. For example, the positions of friendly and potentially hostile military assets may need to be quickly distributed to decision-makers in the field. However, such decision-makers may have various clearances related to their service association, alliance affiliation or nationality and the like. In an era of active international police efforts, the need to simultaneously share information and protect national security interests is particularly challenging and important. Manually reviewing volumes of messages against a complicated array of sanitization rules is time consuming and impractical for certain applications. Moreover, manual administration of rules introduces an undesirable element of human subjectivity and inconsistency into an area where uniformity is of paramount importance.

Attempts have been made to address some of these issues by automation, but such attempts have had limited success. Generally, proposed automated systems have attempted to discern the subject matter of a communication, determine the clearance or authorization of an intended recipient and make a decision as to distribution. Such systems have the potential to accelerate certain decisions, but generally lack the human capacity to redact or sanitize only sensitive subject matter while transmitting as much as possible of the remaining "clean" material. Thus, messages including a large amount of useful and important clean material and a single dirty word, such as a protected code name, may be at least temporarily lost to recipients where the national interest would have dictated a need for immediate distribution.

Automated systems may also be limited due to messaging format considerations. In addition to reviewing messages relative to a variety of sanitation rules, analysis and distribution of messages may require the ability to manage many different messaging formats. In the military context, there are often many sources of information that provide messages in a variety of formats. These different formats may relate to the nature of the messages (e.g., images, text, data and combinations thereof) as well as the nature of the sources (e.g., the service affiliation, nationality, or specific hardware and software environment of the source). There may also be many potential recipients with associated format requirements relating to some of the same issues. This proliferation of formats complicates the goal of automation. That is, if these formats can be handled at all, it may only be at the expense of timeliness due to the need for reconfiguration and, perhaps, re-certification. As a result, neither manual nor proposed automated systems provide optimal performance in relation to security screening.

SUMMARY OF THE INVENTION

The present invention is directed to a machine-based method and apparatus (collectively "utility"), for sanitizing messages based on stored sanitization rules. The utility can quickly and accurately apply the sanitization rules thereby accelerating the distribution of messages. In addition, the utility can apply a variety of rules depending on the context of a message, thus providing particular advantages in an MLS environment. The utility can also analyze messages with a high degree of resolution to maximize transmission of clean information while protecting sensitive subject matter. Moreover, the utility can flexibly handle a variety of source formats, including imaging and text formats, as well as a variety of target formats without undue delays associated recompiling and the like.

According to one aspect of the present invention, a machine-based utility is operative for selectively sanitizing sensitive subject matter from a message to produce a sanitized message for retransmission. That is, the utility does not merely make a binary transmit/do not transmit decision, but sanitizes messages for transmission with sensitive subject matter removed or otherwise protected. The associated method includes the steps of: establishing a computer-based sanitization tool for sanitizing messages based on pre-defined sanitization rules; operating the tool to receive a message relative to a first external system, the first message including sensitive information and clean information relative to an identified recipient; operating the computer-based sanitization tool to identify the sensitive information within the message and to sanitize the message relative to the sensitive information, thereby generating a sanitized message including the clean information; and operating the computer-based sanitization tool for transmission of the sanitized message to the identified recipient. By virtue of this utility, messages can be quickly sanitized such that the identified recipient can access the clean information.

In one implementation, the utility can access multiple rule sets to manage distribution of information relative to a variety of users. The rule sets may be based on the identity of the recipient, an affiliation or nationality of the user or other parameters. An associated sanitization process involves accessing a database including multiple rule sets, using a parameter associated with the identified recipient to select a rule set, and applying the rule set with respect to the message to sanitize the message. It will be appreciated that the utility has particular advantages with respect to MLS systems where the goal is to enable distribution of information to multiple recipients while maintaining multiple levels of security with respect to information dissemination.

According to a related aspect of the present invention, a sanitization utility is operative for transmitting multiple versions of a given message to multiple recipients. The associated method involves: receiving a message for potential distribution; identifying at least first and second potential recipients having first and second clearances, respectively; sanitizing the input message to generate a first sanitized message for transmission to the first recipient; and sanitizing the input message to generate a second sanitized message, different than the first sanitized message, for transmission to the second potential recipient. In accordance with the present invention, a substantially unlimited number of recipients can be accommodated in this regard. The invention thus has particular advantages in contexts where fast and broad dissemination of information is critical, such as multi-lateral defense/policing cooperation and unilateral activities involving multiple parties.

According to a further aspect of the present invention, a sanitization utility is implemented in conjunction with a recursive parsing tool to enable high resolution analysis of messages for security purposes. In this regard, the utility is operative for receiving a message, recursively parsing the message such that the message is parsed into tokens of a desired size, applying sanitization rules with respect to the parsed tokens to identify at least one dirty token, sanitizing the message relative to the dirty token to generate a sanitized message for transmission to an identified recipient. The size of the tokens may be determined based on the sanitization rules, or may be determined based on the nature of the subject matter, processing limitation or other criteria. The utility can thus analyze messages with a high degree of resolution, if desired, such that transmission of clean information is maximized while simultaneously protecting security interests.

According to a still further aspect of the present invention, a sanitization utility is adapted for handling messages relative to a variety of formats. As noted above, certain secure transmission environments are characterized by a proliferation of messaging formats. Thus, in order to efficiently acquire and share information among multiple systems, it is often necessary to effectively handle multiple messaging formats. In accordance with the present invention, an automatic information sanitizer includes an interface engine and a sanitization engine. The interface engine has a generic processing module that can access a database storing specification information for multiple external formats. For a particular message or set of messages, the interface engine can access the database to obtain a corresponding specification, thereby configuring the interface engine for that messaging application. The sanitization engine is operative for sanitizing a given message based on stored sanitization rules. The interface engine is associated with the sanitization engine so as to enable the sanitization engine to interface with any of multiple external systems.

In this regard, the utility can handle multiple input formats associated with multiple external sources and/or multiple output formats associated with multiple intended recipients. In the case of multiple input formats, the interface engine is operative for identifying a format of an input message, accessing the database to obtain the corresponding specification and parsing the message into tokens for analysis by the sanitization engine. Many input formats may be supported in this regard, including various text and image formats. In the latter regard, the interface engine may parse the imaging information to identify intelligible elements for processing by the sanitization engine. For multiple output formats, the interface engine is operative for receiving at least one sanitized message from the sanitization engine, identifying a format associated with an identified recipient, accessing the database to obtain the corresponding specification, and formatting the sanitized message in accordance with the obtained specification. The automatic information sanitizer is thus able to support multiple input and/or output formats as is desirable for many sanitization applications.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

The present invention is directed to a message parsing and formatting utility. The invention is applicable in a variety of contexts where it is desirable to transform information from an external format to an internal representation for use by an application or vice versa. Moreover, the invention may be implemented in conjunction with a variety of different applications. In the following description, the invention is set forth in the context of a sanitization system for controlling dissemination of classified information. This context serves to illustrate the various functions and advantages of the present invention, but it should be appreciated that the invention is not limited to this context.

A. Overview

Figure 1:
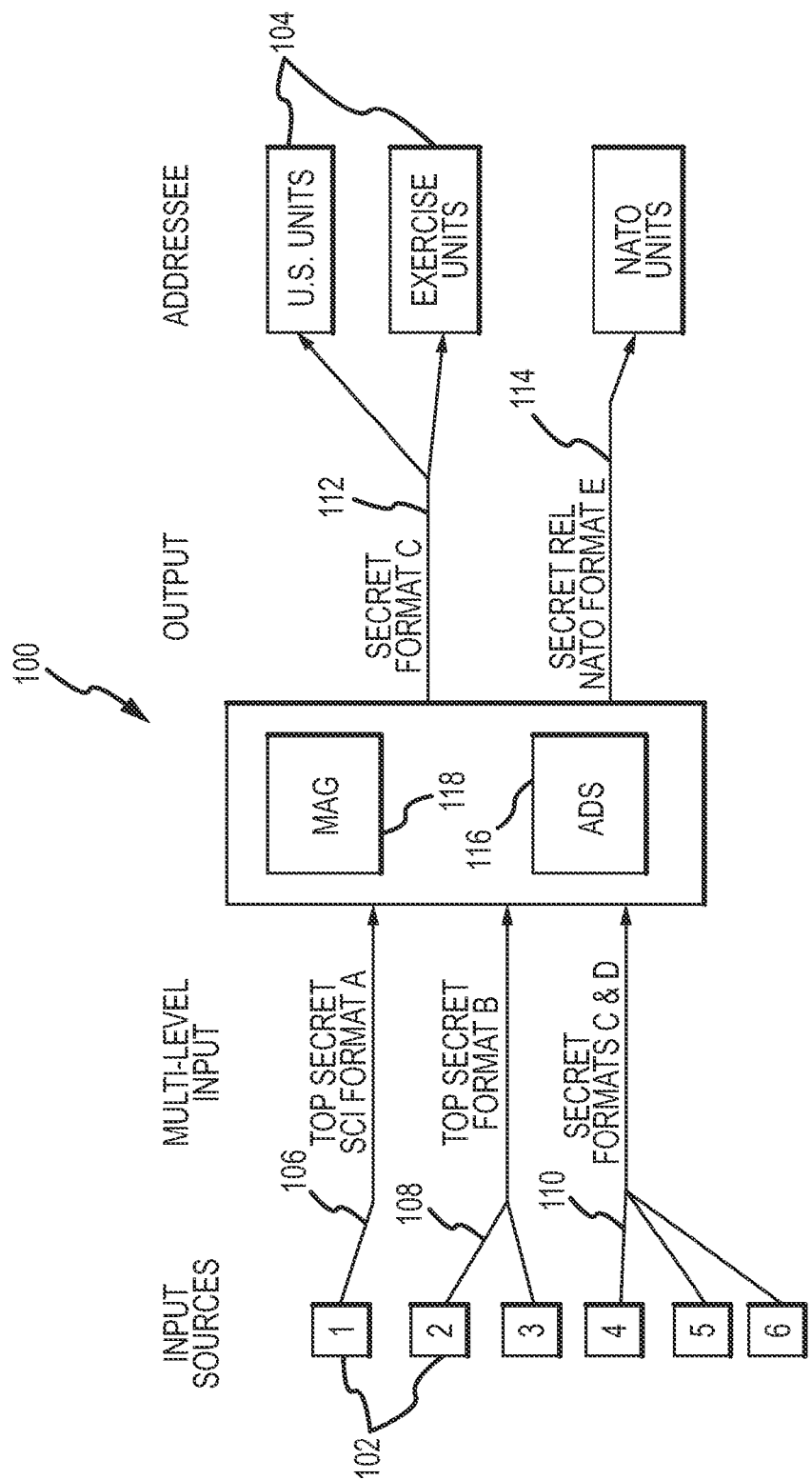
FIG. 1 is a schematic diagram of a classified information processing and distribution system in accordance with the present invention.

FIG. 1 is a schematic diagram providing an overview of a classified information processing and distribution system 100 in accordance with the present invention. As shown, multiple input sources 102 provide information to the system 100 at various levels of classification. In the illustrated example, these classifications include "secret" and "top secret", as well as sensitive compartmented information (SCI). This information is reported over various communication channels 106, 108 and 110 and in different message formats, in this case designated formats A-D. The system 100 sanitizes that data to the classification levels required for dissemination over lower level channels 112 and 114 to addressees 104, at least some of whom do not have clearance sufficient to receive all of the input information, i.e., addressees who are only authorized to see sanitized versions of the data. In the illustrated case, the output channels 112 and 114 are associated with classification levels "Secret" and "Secret Rel NATO." The system 100 accommodates different addressee consumers by reporting data in formats they understand or can process, which may or may not be the same as the original reported format. In the illustrated embodiment, the output channels 112 and 114 are shown as handling data in formats C and E, i.e., one of which (C) overlaps the input formats and one of which (E) does not.

The system 100 supplements or replaces conventional manual sanitizer terminals and provides a standard intelligence data communications interface. The system 100 implements sufficiently trusted software and hardware within a system concept that removes the human interaction required by manual sanitization. This accelerates delivery of time sensitive information, since human intervention is not required for each message release. It also increases the level of trust, since a computer can be relied upon to perform repeatedly the same tasks in exactly the same way, unaffected by the type of performance distractions to which a human operator may be subject.

Application of the "need-to-know" doctrine within the compartmented security system of the United States means that various users are to receive only selected subsets of the information and products produced by the intelligence community. Gatherers of this intelligence information and creators of the intelligence product initially are responsible for determining the security level of their output. Systems which subsequently distribute and further process this information, including the illustrated system 100, are responsible for insuring that the integrity of the security classifications are maintained.

The classification of a message such as an individual contact report is defined by the sensitivity of the information in the data fields within the report format. It is possible to modify (e.g., change or delete) the information in specific fields within the contact report to reduce the overall classification of the message information and so give the message a broader releaseability. In the past, this action required determination by an operator/analyst to insure that product dissemination did not compromise higher-level accesses or compartments. This added processing delay time to contact data which is often time-critical to the final tactical user, e.g., the Command and Control tactical decision-maker or the Over-the-Horizon weapon system.

In some cases, the nature of the data and message formats used for data distribution permit the system 100 to insure that sanitization, downgrading or screening is properly accomplished quickly. This is especially true in the following cases: where message formats are well-defined and controlled and contain free text fields; where these free text fields may be simply eliminated from the resultant outgoing product; and where the rules governing information classification and the formatted data fields are well defined and understood.

The illustrated system 100 generally includes an Automatic Data Sanitizer (ADS) module 116 and a Message Analysis and Generation (MAG) module 110. The ADS module 116 provides the automated means by which formatted multi-level classified data, including SCI, is sanitized and rapidly disseminated at different classification levels. The module 116 in cooperation with the MAG module 118 accepts classified data from designated communications channels, sanitizes and then reclassifies the data according to user-designated rules, and verifies that the data meets a set of precisely defined and rigorously controlled criteria for release. The ADS module 116 releases the information at a different level of classification or compartmentation, typically at the general service (GENSER) level. The system 100 disseminates the information only to users cleared for that level of classification and/or compartmentation. It does not disclose or release data to unauthorized consumers.

The MAG module 118 addresses issues relating to accommodating different data formats. As noted above, the various external systems that define the input sources and output addressees/consumers of classified information are characterized by a proliferation of data transmission formats. The MAG module 118 generally performs two transformation functions in this regard. First, the module 118 transforms input data from the various external formats into the internal data representation of the ADS module 116. Then, the MAG module 118 receives sanitized information from the ADS module in the internal representation and transforms such information into the various external formats of the addressee systems. It will thus be appreciated that the MAG module 118 is capable of handling a variety of external formats. As will be described in more detail below, the MAG module 118 is a table driven subsystem that can access multiple external format specifications stored in a table structure so as to implement these transformation functions without undue delay.

The following description is generally divided into two sections. First, the various interface functions as implemented by the MAG module 118 are described. These functions include the parsing of input data and formatting of output data. Next, the following description includes a detailed discussion of the various sanitization related functions implemented by the ADS module 116.

B. The MAG Module

FIGS. 2-8 illustrate the various structures and processes of the MAG module. Although the MAG module is described for use in connection with the sanitization and distribution of classified information and has particular advantages in this regard, it will be appreciated that various aspects of the MAG module are useful in other contexts in connection with other applications. In this regard, many applications need to parse and format message data. These functions are generally transformations between external and internal (application-specific) representations of information. The MAG module provides a simply invoked and powerful utility for both transformations.

Figure 2:
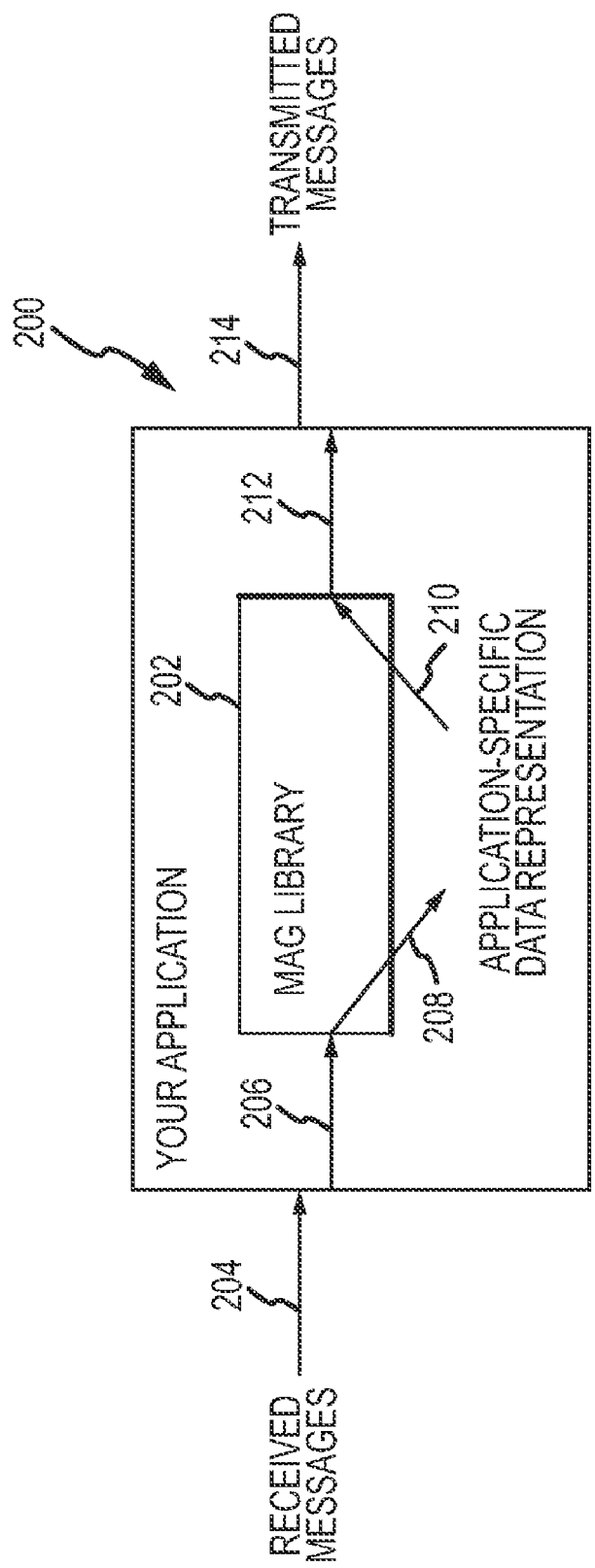
FIG. 2 is a schematic diagram showing an information flow relative to a MAG module in accordance with the present invention.

FIG. 2 provides a schematic diagram of the MAG module functionality. In the illustrated example, the MAG module 202 is incorporated into and may be called by a processing system 200 such as the classified information processing and distribution system of FIG. 1. The system 200 receives messages 204 in any of multiple external formats. The module 202 receives an input 206 based on the received message 204 and processes the input 206 to provide a transformed input 208 reflecting an application-specific data representation. The processed input 208 is then further processed by the system 200 to generate an output 210, again reflecting an application-specific data representation. This output 210 is then processed by the MAG module 202 to generate a processed output 212 reflecting an external format of an identified addressee system. The system 200 then provides e.g., transmits or otherwise makes available for transmission an output message 214 based on the processed output 212.

As will be discussed in more detail below, the MAG module 202 is recursively invoked and is driven by format specifications. Such recursive invocation enables the module 202 to provide a selectable parsing resolution to address specific parsing processes. In this regard, the utility can parse entire messages, data sets within a message, data items within a data set and sub-items within a data item. The data can thus be analyzed in a tailored fashion as precisely as the calling application requires. The module 202 can thereby implement single instances of various message processing functions (e.g., extraction, content validation, checks and validation) at each such level of a message. All of this functionality is based on a platform and application independent library enabling reuse of the MAG module 202 in a variety of computing environments. Moreover, the common form of the internal representation of data used by the module 202 simplifies message translation.

Figure 3:
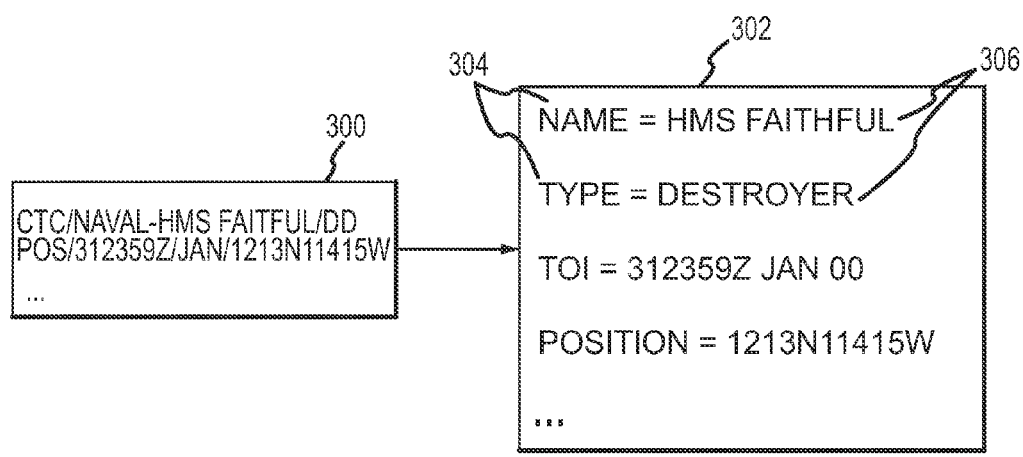
FIG. 3 illustrates an input data transformation in accordance with the present invention.
Figure 4:
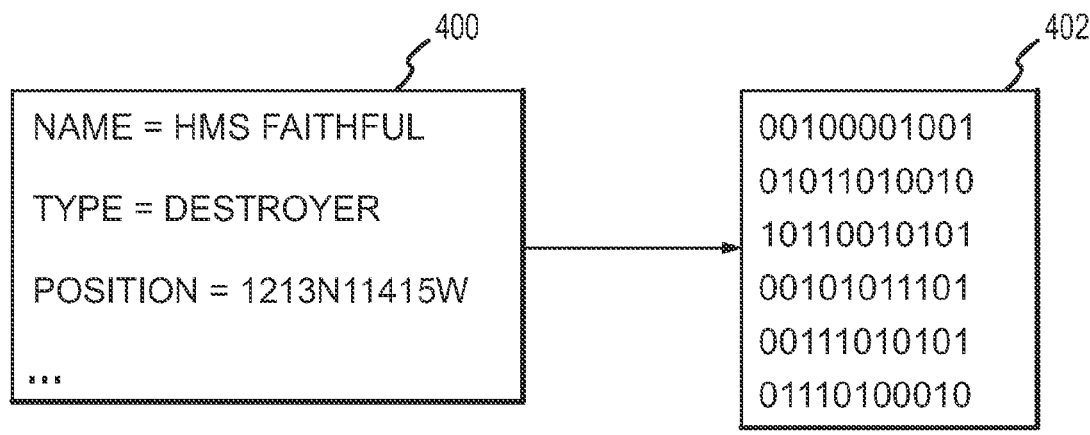
FIG. 4 illustrates an output data transformation in accordance with the present invention.

As noted above, the illustrated Mag functions entail two separate data transformations. The module 202 can handle various messaging formats including character-oriented (ASCII) and bit-oriented (binary) messages. The transformation processes that are possible are as varied as the permutations of different source and addressee formats. FIGS. 3 and 4 schematically illustrate character and binary message transformations respectively. Specifically, these Figs. illustrate an exemplary information flow through a sanitization system incorporating the MAG module 202 where input text is received in a character based input format and sanitized data is output in bit based format.

Referring first to FIG. 3, box 300 illustrates a formatted character-based message input. The input 300 includes a number of data fields from which useful data can be extracted. The process for extracting such data involves accessing a format specification, using the format specification to parse the message into its various fields and reading the information from the various fields. Box 302 illustrates an internal data representation that can be understood by the calling application. In this case, the internal representation 302 includes a number of tags 304 identifying the data fields together with content 306 associated with each such tag. FIG. 3 thus illustrates an input transformation process from an external format to an internal data representation.

FIG. 4 illustrates an output transformation. Box 400 represents an internal data representation. The content of this message may be the same or different than the input message. In the illustrated example, the message 400 is a sanitized message (at least the Time of Intercept—TOI—field has been eliminated from the input message as shown in FIG. 3). In the illustrated example, the message 400 is transformed to a binary message output 402. The binary message 402 includes all of the data for message 400 organized in a format that will be understood by an identified addressee system. Again, this transformation is performed based on a format specification defining the corresponding external format.

Figure 5:
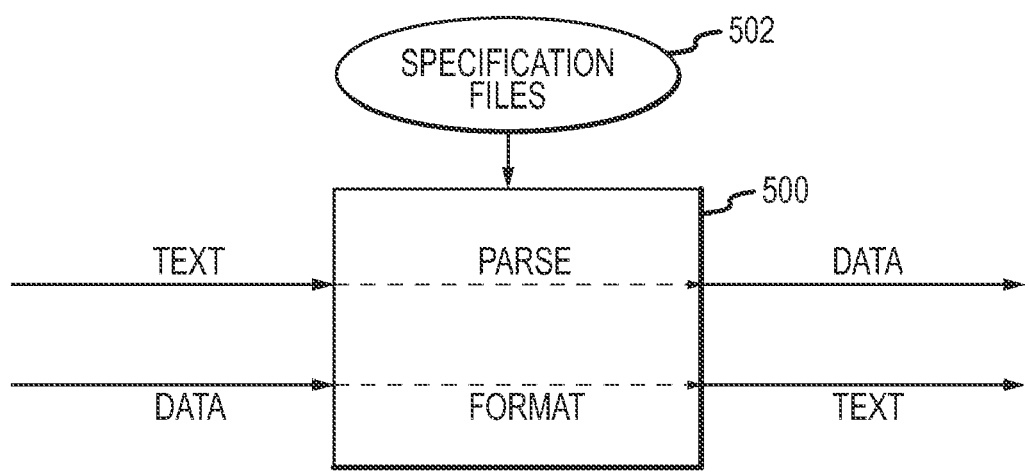
FIG. 5 illustrates a high-level architecture of the MAG module of FIG. 2.

The MAG module thus provides a message disassembly and reassembly engine. A preferred architecture for such a module 500 is generally illustrated in FIG. 5. As shown, the module 500 is configurable for different transformation processes by accessing stored specification files 502. The specification files 502 may be stored in format specific tables, e.g., in a relational database where each table includes a format specification and an identifier or link for that format. Details of the various formats thus reside outside of the executable software of the module 500 and outside of the calling application. When the module 500 is required to process a new message format (input or output format) software modifications are generally not required. Rather, a new format specification can simply be added to the specifications files 502. Similarly, when an existing message format changes or a source system breaks predefined rules, it is generally unnecessary to rewrite software. Such issues can generally be addressed by modifying a file of the specification files 502.

The formats and associated specifications may be standard or custom formats. Examples of formats that may be supported by the module 500 include OTHT—Gold, OIL-STOCK, KLIEGLIGHT, TACELINT, TACREP, TIBS binary, ENSCORE—ELD, NITF, SENSOREP, SAR, TRE Tabular, various inter-database formats and numerous specialized formats. The module 500 can process and transliterate on a line-by-line or similar basis relative to such formats. Simple user interfaces may be provided for selecting and defining formats to be supported for a particular application as set forth in the Parent Application.

The specifications are thus external to the compiled software. As a result, it is unnecessary to recompile software each time processing formats change. The specifications are also generally hierarchal. That is, the specifications may be defined relative to an overall message, a data group, a data item, and data sub-items. Accordingly, as will be discussed below, the module 500 can implement a substantially unlimited depth of resolution and text analysis. Moreover, many of the attributes of the specifications are inheritable. That is, many specifications evolve from a common lineage. For example, two specifications may have evolved from a common parent. In such cases, many of the specifications' attributes can be inherited from the parent thus simplifying specification definition and reducing the required storage space. Similarly, many of the attributes of the various specifications are reusable. For example, it is generally unnecessary to respecify the known months of the year each time a message references one.

The basic paradigm of a system implementing the MAG module is a parse-process-reassemble paradigm. An example of the intermediate process step is set forth in the latter section of this description. The associated concepts of parsing, parsing resolution, inheritance and the like may be better understood by reference to the parse tree 600 of FIG. 6. For the purposes of this example, consider the components that constitute a simple document 602. In this case, the document 602 is composed of sections of text separated by section markings. The defined sections might include introduction 604, scope, 606, references 608, descriptive 610 and recommendation 612 sections. Each descriptive section 610 may be further divided into an introductory paragraph 614, a series of section body paragraphs 616 and a summary paragraph 618, each separated by a blank line. Each paragraph may be divided into sentences 620 separated by periods, question marks, or exclamation points. Each sentence may further be divided into words 622 separated by blanks. The parsing functionality of the MAG module is recursive. That is, the module can iteratively access and parse the "tokens" that constitute the content of various levels of the parse tree 600. The specifications describing these various tokens are to referred herein as "Mags." Thus, in the illustrated example, the specification describing the document is the top level Mag. The introduction, scope, references, descriptive and recommendation section Mags are all children of the document Mag, and each is a sibling Mag to one another. Similarly, each descriptive section Mag is a parent to (or composed of) an introductory paragraph Mag, a repeatable body paragraph Mag, and a summary paragraph Mag. The hierarchy of parent and child continues to the lowest level of individual words in a sentence in this example. Thus, the MAG module can be recursively invoked to provide substantially any level of processing resolution. For example, a message may be parsed to the word level to search for "dirty words". In such a context, a sanitization process can be tailored to carefully protect against dissemination of protected information while enabling maximal transmission of clean information.

Figure 6:
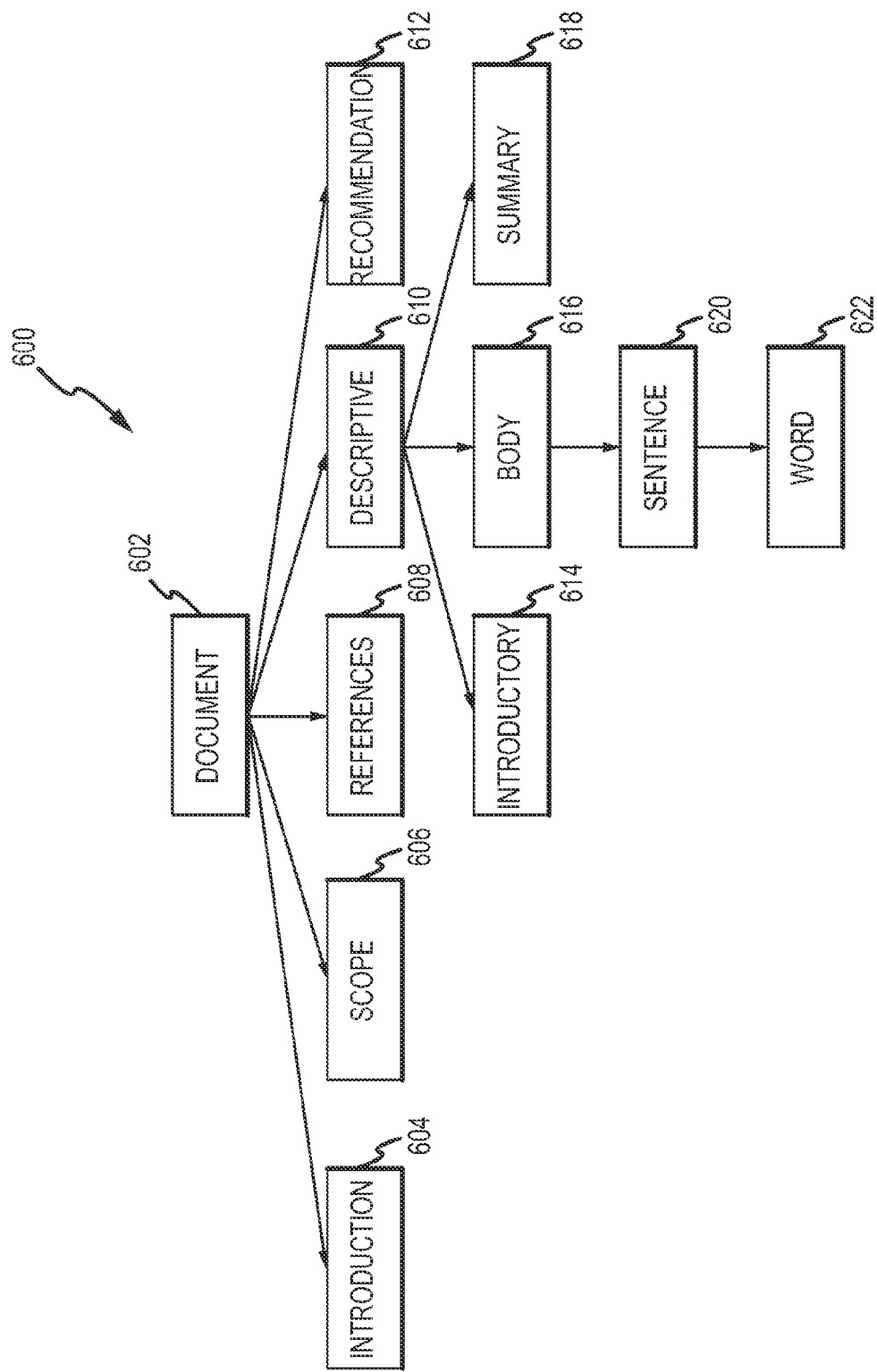
FIG. 6 illustrates a parse tree that may be executed by the MAG module of FIG. 2.

Also, from the parse tree of FIG. 6, it will be observed that many of Mags' attributes can be inherited from related Mags, thereby simplifying Mag definition and the required storage. The associated Mag specification tree, including all specifications of alternatives, components, delimiters, and so on, provides the roadmap needed to traverse the textual message. As the text of the message is sequentially parsed, available branches of the specification tree are followed or rejected to allow full understanding of message content. The text pertinent to an accepted branch is isolated and provided to higher resolution (component) specifications: a line of text is isolated and extracted based on its delimiters and lengths, and is then handed down to component field specifications which perform similar functions, isolating and extracting text for processing by component sub-field specifications.

The specifications define various Mag parameters. A Mag parameter is a variable aspect of the Mag definition that controls some part of Mag behavior. Most parameters of a Mag specification need not be defined; typically, this means that the validation or construction associated with that parameter specification will not be performed. Parameters may also be inherited from a parent Mag, so that child Mags need not repeat the specification of parameters of the parent. For each parameter, the requirements may be grouped by applicability to specification parse and format.

A detailed listing of parameter types is provided in the Parent Application as well as user interface implementations related thereto. Some of these parameters are: identification parameters that allow for identification of a Mag including specification of component or parent relationships and inheritability of parameters and specification of Mg type such as format-type (e.g., TACELINT) or field-type (e.g., ORIGINATOR); delimiting and length parameters that provide the means by which the content or text domain associated with a Mag is distinguished or isolated from the text that surrounds it including definition of delimiter symbols, maximum length and minimum length; content restriction parameters such as verification of allowed characters and detection of non-data indicators; and component parameters by which each Mag can specify a list of components that must be parsed in conjunction with the process by which the higher level Mag is itself parsed. This last parameter type will be better understood upon consideration of the following process flow discussion.

The processes implemented by the MAG module include parsing and formatting. In the context of the illustrated implementation of the present invention, parsing is the transformation of information from the input text domain to the internal data domain and formatting is the transformation of information from the internal data domain to the output text domain. While parsing is essentially a message-driven activity in which Mag specifications are chosen from those available based on how well they accommodate the message, formatting is a specification-driven activity in which text is generated based on the availability of internal data to populate it.

Figure 7:
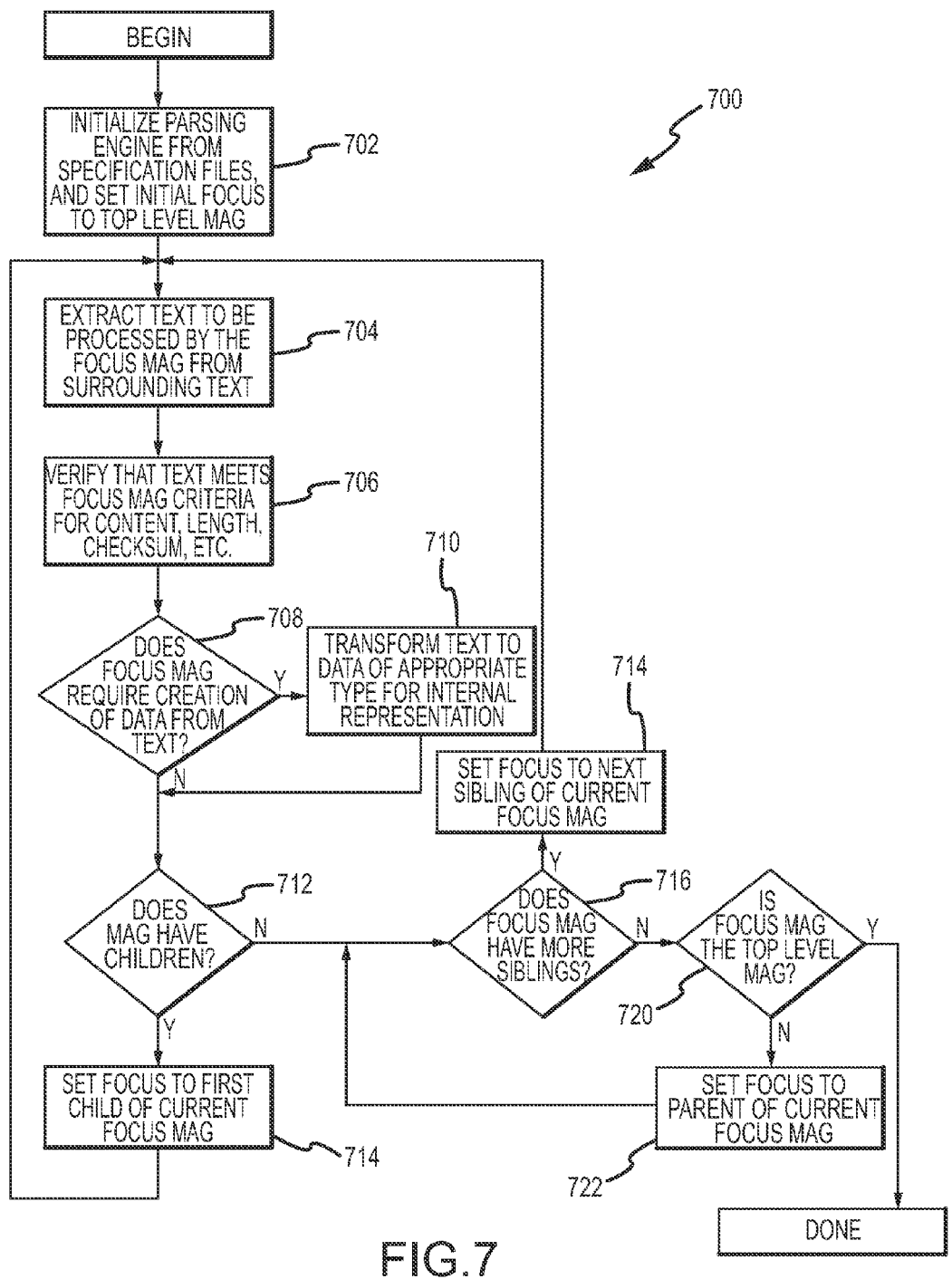
FIG. 7 is a flowchart of a Mag parse function in accordance with the present invention.

FIG. 7 is a flow chart illustrating the Mag parse function 700. The function 700 begins with initializing (702) the parsing engine component of the MAG module from specification files and setting the initial focus of the parsing engine to the top level Mag. This involves identifying the external format of the information source accessing the corresponding specification from the specification tables and using the specification to configure the parsing engine. The specification will also define the top level Mag. This Mag becomes the "focus" Mag for the ensuing processing. The MAG module then extracts (704) the text to be processed by the parsing engine using the focus Mag from the surrounding text. Specifically, a primary purpose of the parsing function 700 is to transform a message from an external format to an internal representation. This is implemented based on the specification for the external format. For each token of a parse tree, the associated text is processed based on its Mag.

Prior to transformation, the MAG module verifies (706) that the text meets focus Mag criteria for content, length, checksum, etc. It is then determined (708) whether the focus Mag requires creation of data from text. If so, the text if transformed (710) to data of an appropriate type for internal representation. If not, further parsing may be required. In this regard, the MAG module next determines (712) whether the focus Mag has any children. If so, the focus of the parsing engine is set (714) to a first child of the current focus Mag and the process defined by blocks 704, 706, 708 and 710 is repeated using the new focus Mag. It will thus be appreciated that loop 704, 706, 708, 710, 712 and 714 defines a process for recursively parsing along a particular lineage (the "intralineage parsing process") to achieve the parsing resolution required for an application under consideration. If it is determined during any such iteration at block 712 that the focus Mag does not have children, then the MAG module determines (716) whether the focus Mag has any siblings. If so, the focus of the parsing engine is set (718) to the next sibling of the current focus Mag and the intralineage parsing process is repeated with respect to this sibling. In this manner, different lineage branches of the parse tree can be parsed to the resolution required for a particular application.

If it is determined at block 716 that the current focus Mag has no more siblings, then the MAG module determines (720) whether the focus Mag is the top level Mag. If not, the MAG module sets (722) its focus to the parent of the current focus Mag to see whether the parent has any siblings. The loop thus defined can be iterated to work back up through the parse tree to the top level Mag. In this manner, any Mag relationships that may have been missed working downward through the tree can be identified. Once the top Mag is reached, the process is complete.

Figure 8:
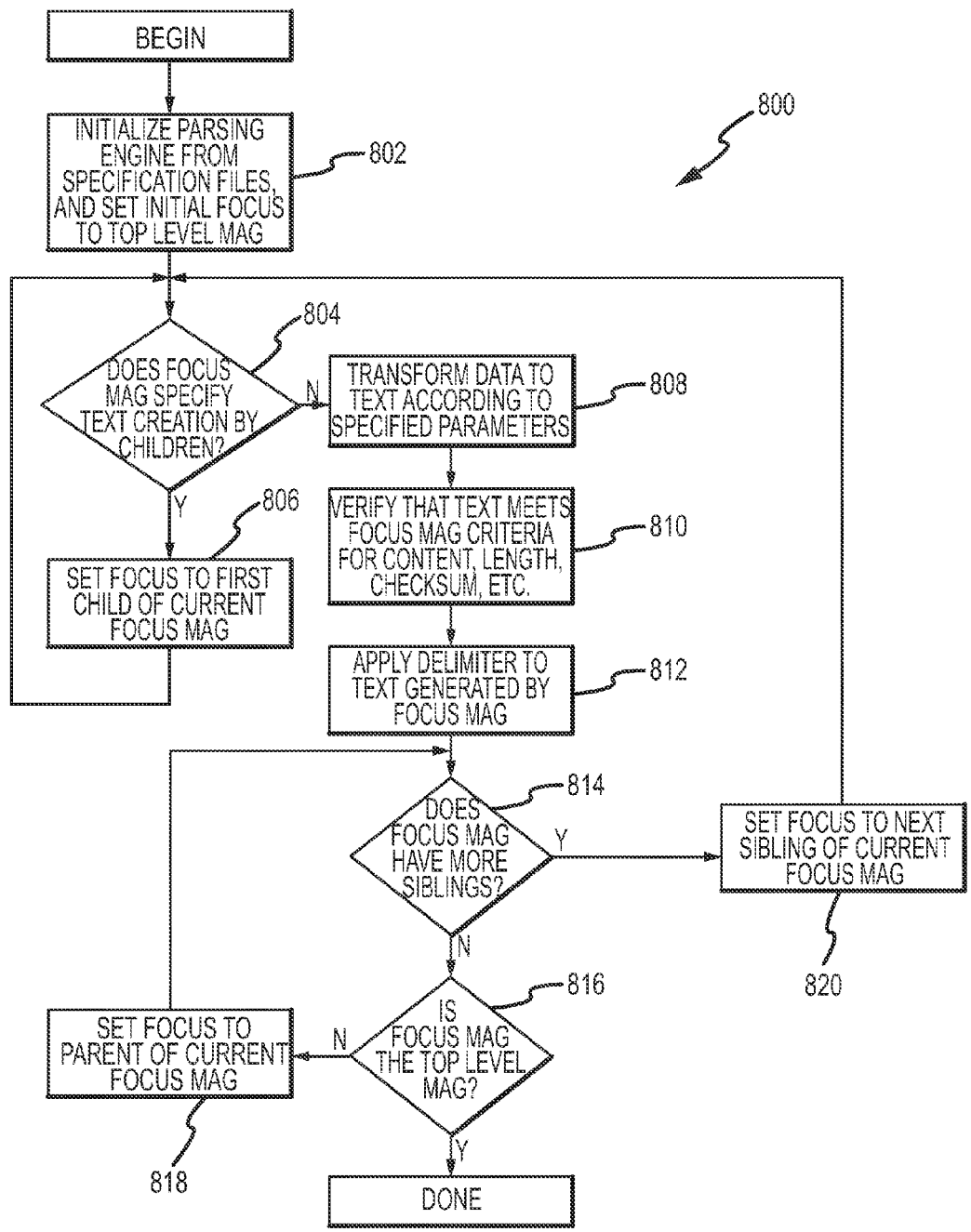
FIG. 8 is a flowchart of a Mag format function in accordance with the present invention.

FIG. 8 shows a flow chart for the Mag format function 800. The process begins by initializing (802) the parsing engine from the specification files and setting the initial focus of the engine to the top level Mag. Similar to the process described above, this involves identifying a format of an external addressee system and accessing the corresponding specification table to configure the parsing engine. In order to transform a message from an internal application specific representation (e.g., in a data format) to an external addressee format, it is necessary to parse the message to the parsing resolution required for transformation to the target format. Thus, the MAG module next determines (804) whether the focus Mag specifies text creation by children of the current focus Mag. If so, then the focus is set (806) to the first child of the current focus Mag. The loop defined by blocks 804 and 806 is then iterated until the MAG module determines at block 804 that the focus Mag does not specify text creation by children. At this point, the required processing resolution has been achieved with respect to the focus Mag. In this case, the MAG module transforms (808) the content associated with the focus Mag from the internal representation (e.g., data) to the target format (e.g., text) according to the parameter specified by the focus Mag. The resulting text is then analyzed to verify (810) that it meets focus Mag criteria for content, length, checksum, etc., and any appropriate delimiters are applied (812) to the resulting text.

Next, the MAG module determines (814) whether the focus Mag has any siblings. If so, the focus is set (820) to the next sibling of the current focus Mag and the preceding parsing and transformation steps are repeated. If the focus Mag does not have siblings, the MAG module determines (816) whether the focus Mag is the top level Mag. If not, the focus is set (818) to the parent of the current focus Mag and the resulting loop is iterated to work back up through the parse tree and identify any Mag relationships that may have been missed working downward. When it is determined at block 816 that the focus Mag is the top level Mag, then the process is complete.

In the context of the system 100 of FIG. 1, the MAG module 118 as described above is operative to interface the ADS module 116 with the various source systems and addressees. The operation of the ADS module 116 will now be described.

C. ADS Module

Figure 9:
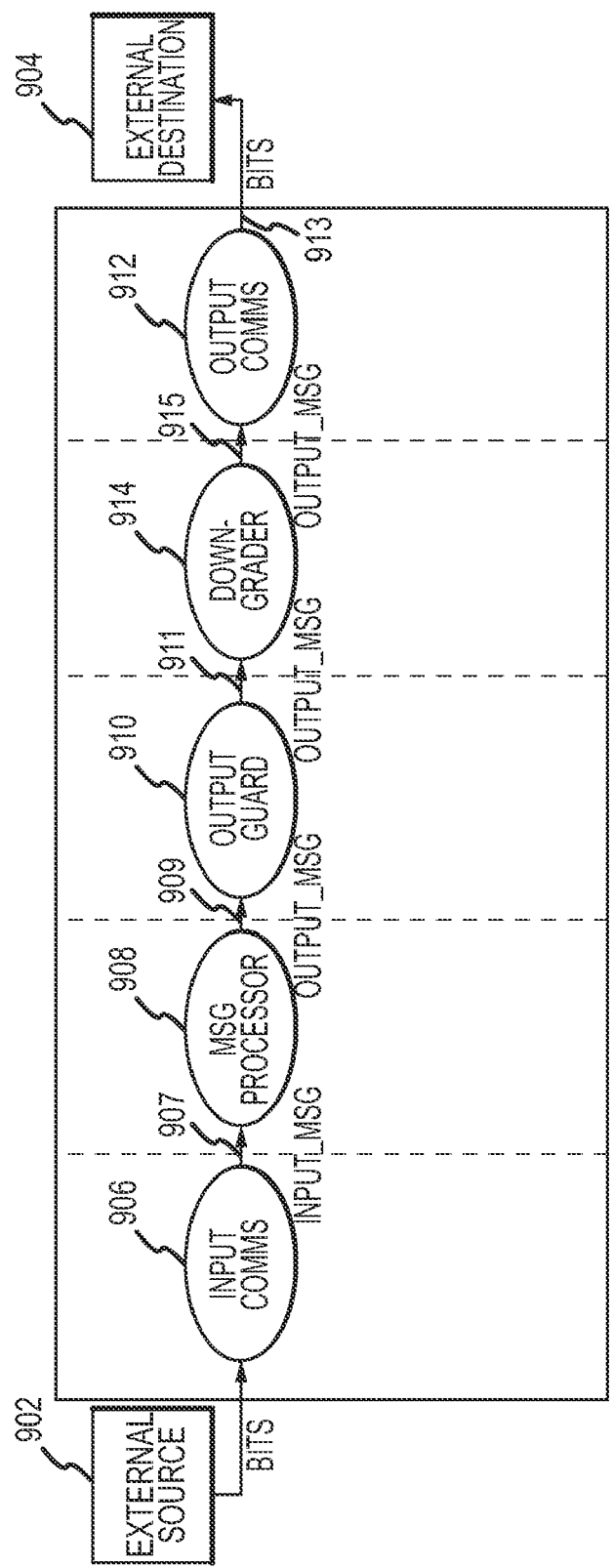
FIG. 9 is a schematic diagram of an ADS module in accordance with the present invention.

FIG. 9 is a schematic diagram of the ADS module 900. The module 900 automatically modifies, or sanitizes, formatted data from an external source system 902, according to sanitization rules, for release to an external destination system 904 so that the destination system receives only that portion of the original data for which it is authorized access. The module 900 generally includes an Input Comms Module 906, a Message Processor 908, an Output Guard 910, and a Downgrader 914 and Output Comms 912. The Input Module 906 supports the communications protocol dictated by the external source system 902 and forms a complete message from the message segments provided to it by the external system 902. The resulting complete input message 907 is then provided to the Processor 908 which sanitizes the message according to rules written for the specific external system 904 under consideration. The sanitized message 909 is then passed to the Guard 910 which verifies that the modifications performed by the Processor 908 are correct. The Guard 910 then passes the verified message 911 to the Downgrader 914 that in turn passes an output message 915 to the output directory of the Output Module 912, which supports the communications protocol dictated by the external destination system 904 so as to effect communication of an output message 913 from the ADS module 900.

Figure 10:
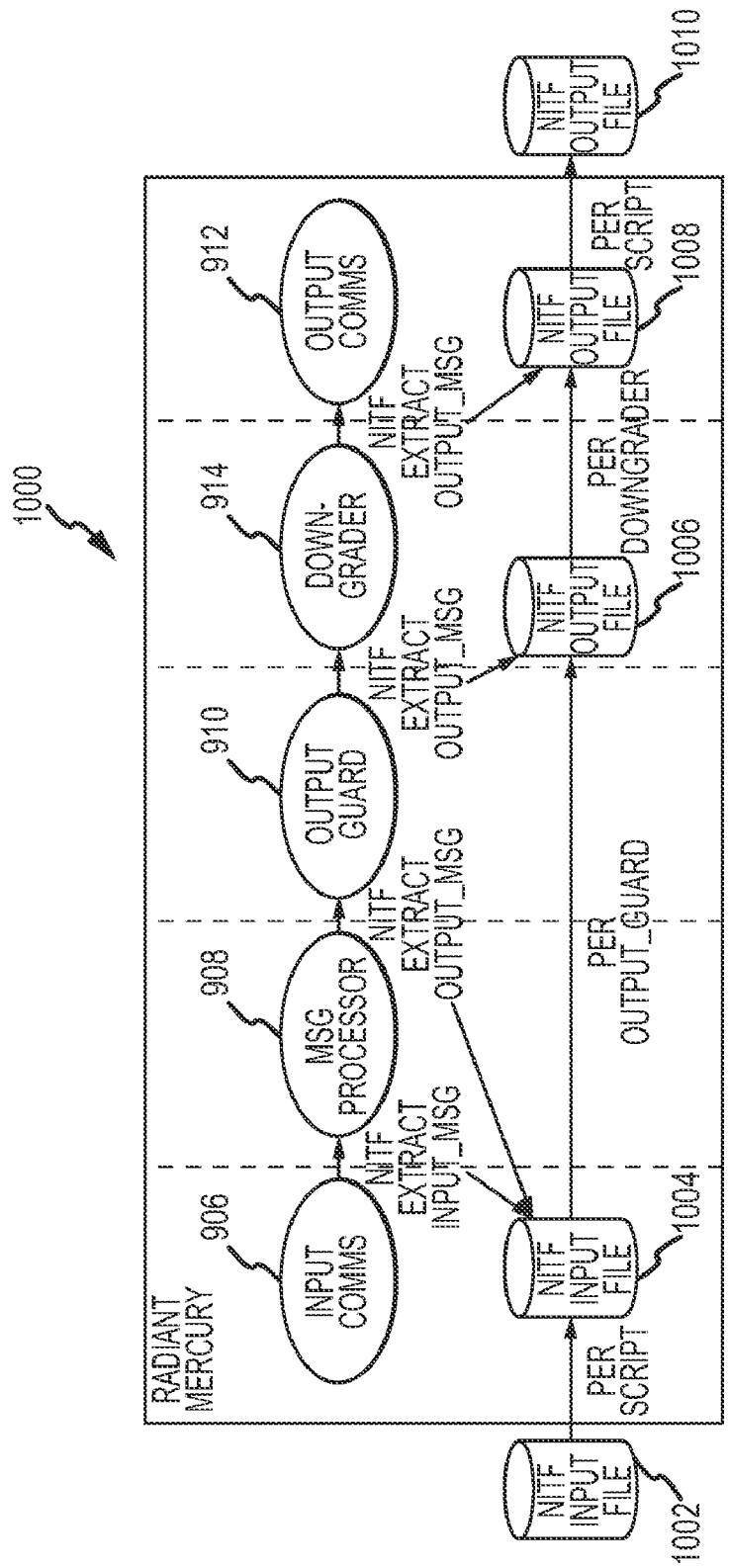
FIG. 10 is a schematic diagram of an alternative implementation of an ADS module in accordance with the present invention.
Figure 11:
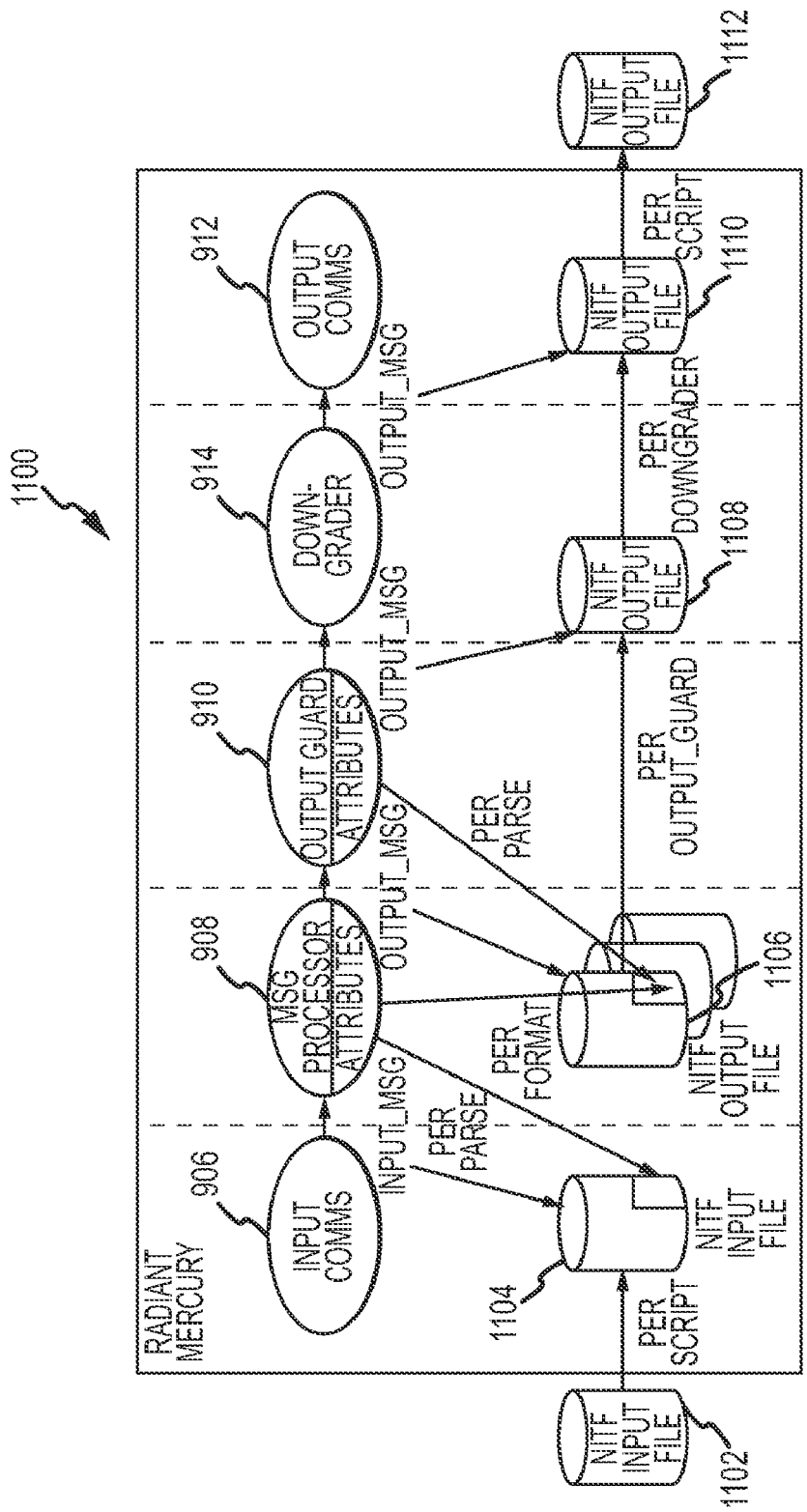
FIG. 11 is a schematic diagram of a further alternative implementation of an ADS module in accordance with the present invention.

FIGS. 10 and 11 show certain modifications of the ADS module for handling messages including images. The components of the modules illustrated in FIGS. 10 and 11 that correspond to components of FIG. 9 are identified by the same numerals. In a variety of applications, including dissemination of tactical information, it is desirable to be able to sanitize and distribute messages including images. However, the processing of such image messages presents certain challenges. First, image messages include image elements that are not readily susceptible to analysis using conventional sanitization rules. In addition, when text and other data components are included together with images, there is a need to separate the intelligible data from the image components. Image messages also often constitute very large files, e.g., sometimes in excess of two gigabytes. Currently, many tactical systems do not have this much RAM. Accordingly, the module structures of FIGS. 10 and 11 include certain modifications to address the needs of handling image messages.

Referring first to FIG. 10, the sanitization module 1000 is illustrated in an exemplary application for processing an image message in one standard image messaging format; namely, NITF. A goal of the module 1000 is to process NITF messages as much as possible like simple textual messages. The principal modifications relate to file management. In this regard, the message text is kept in an external file. Thus, the input file 1002 is initially stored in an input file database directory 1004. Upon completion of processing by the Message Processor 908 and Output Guard 910 as discussed below, the file is transferred to the Downgrader working directory 1006. The message as prepared for transmission by the Downgrader 914 is finally stored in transmission output file directory 1008 from which the output message file 1010 is made available to addressee systems. It will thus be observed that the large message file including its inscrutable image components is never loaded into running memory. Rather, the message is separated into its inscrutable image components and its intelligible data components and the processing capabilities of the Processor 908, Guard 910 and Downgrader 914 are allowed to operate only on the intelligible data components that are generally of a manageable size.

Accordingly, an initial parsing or processing rule is added to the various parsing and processing rules used for handling data. This initial rule identifies and deletes from the working files to be processed by the Processor 908, Guard 910 and Downgrader 914 certain inscrutable components. For example, such components may be identified based on size. In this regard, an attribute size threshold may be established that is sufficiently large to allow for processing of all text and other data, but sufficiently small to avoid loading image data into running memory. Such a rule is easily executed and the data components that remain for processing can then be processed using sanitization rules as discussed above.

More specifically, with regard to the input file 1002, a script can be used to access the NITF file from an external upstream system and write the NITF file into the Input Comms working directory 1004. The Input Comms 906 is then operative to implement the initial rule as noted above for separating intelligible data from image components. The Input Comms 906 also verifies message length and other components and passes the extracted input message to the Message Processor 908. The Message Processor 908 parses the extracted input message, applies the sanitization rules to the parsed extracted input message and generates an extracted output message that is passed to the Output Guard 910. The Output Guard 910 then verifies the extracted output message against release constraints, moves the NITF file to the Downgrader working directory 1006 and passes the extracted output message to the Downgrader 914. The Downgrader 914 moves the NITF file to the Output Comms working directory and passes the NITF extracted output message to the Output Comms 912. Finally, the Output Comms 912 invokes an output script to move the NITF file to an area where it can be accessed by an external addressee system.

FIG. 11 shows an ADS module 1100 with further modifications for image message handling. In this case, again, a script is used to access an NITF file 1102 from an external source system and write the file into the Input Comms working directory 1104. The Input Comms 906, again, is operative to verify the message length and other parameters. However, in this case, the Input Comms does not attempt to parse the input message so as to extract intelligible data. Rather, the Message Processor 908 parses the NITF file into intelligible elements (character and numeric attributes) and nonintelligible elements (file attributes, pointing to segments of original NITF file). The Message Processor 908 then applies the sanitization rules to the parsed NITF file including attributes of all types and generates an output message pointing to an entirely new NITF file 1106 using the attributes. Finally, the Message Processor 908 passes the output message to the Output Guard. The Output Guard 910, in this case, also parses the NITF file into intelligible elements and nonintelligible elements and verifies the parsed NITF file 1106 per release constraints and moves the NITF file 1106 to the Downgrader working directory 1108. The Downgrader 914 moves the NITF file 1106 to the Output Comms working directory 1110 and passes the output message pointing to the NITF file to the Output Comms 912. Finally, the Output Comms 912 invokes a script to move the NITF file to an area 1112 accessible by an external addressee system.

Figure 13:
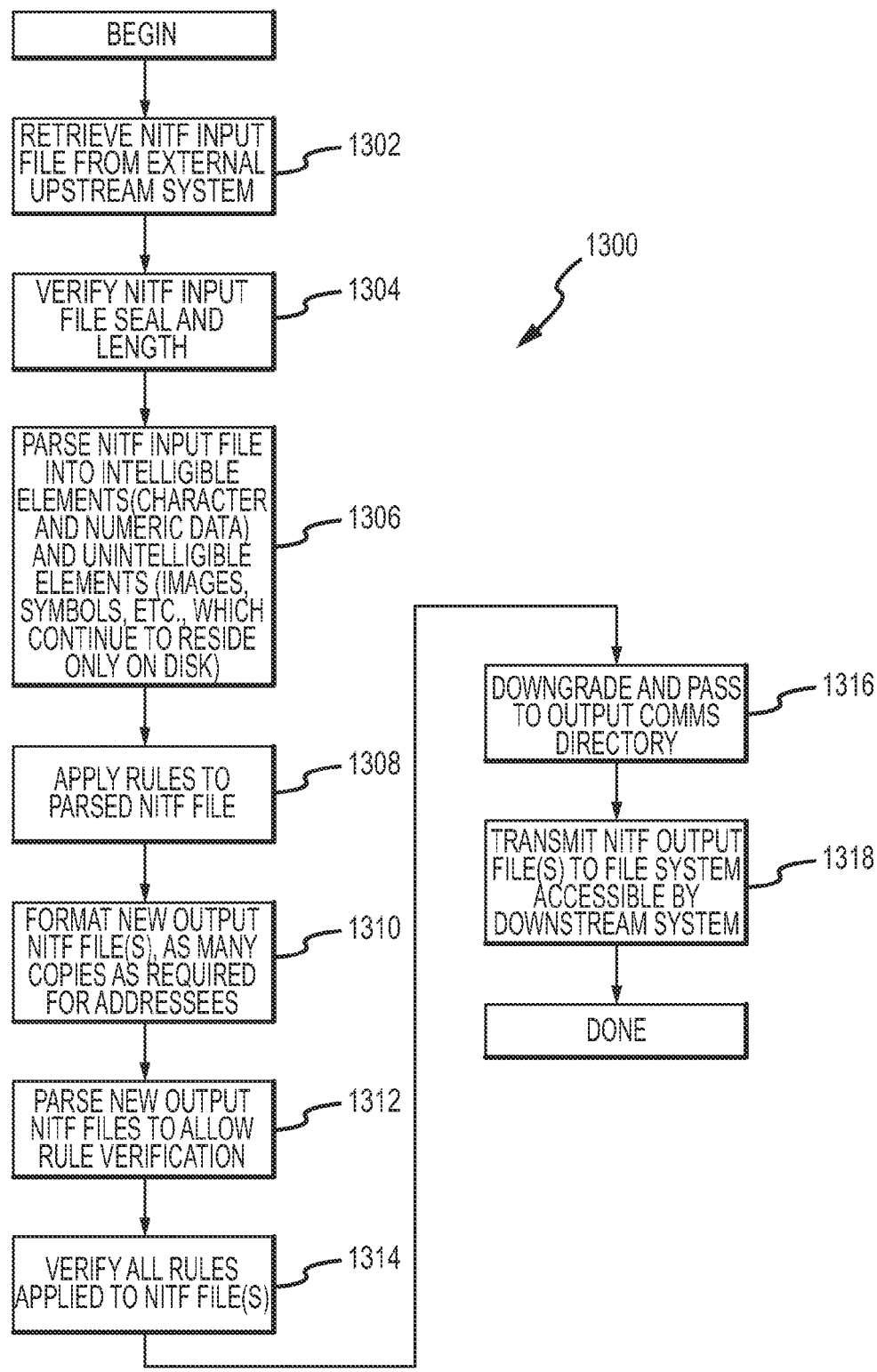
FIG. 13 is a flowchart of an image message process in accordance with the present invention.

FIG. 13 is a flowchart illustrating the sanitization module processing 1300 for handling image messages in accordance with the structure of FIG. 11. The process is initiated by receiving (1302) an NITF input file from an external upstream (source) system. Next, the NITF input file seal and length are verified (1304) and the input file is parsed (1306) into intelligible elements and unintelligible elements. In this regard, the intelligible elements can be moved into running memory while the unintelligible elements including images, symbols, and the like continue to reside only on disk. The module then applies (1308) the appropriate rule to the parsed NITF file and formats (1310) a new NITF file or files including as many copies as required for the addressees. The new output NITF files are then parsed (1312) to allow rule verification and all rules applied to NITF files are verified (1314). The NITF output files are downgraded and passed to the Output Comms directory. Finally, the NITF output files are transmitted (1318) to a file system that is accessible by a downstream (addressee) system.

Figure 12:
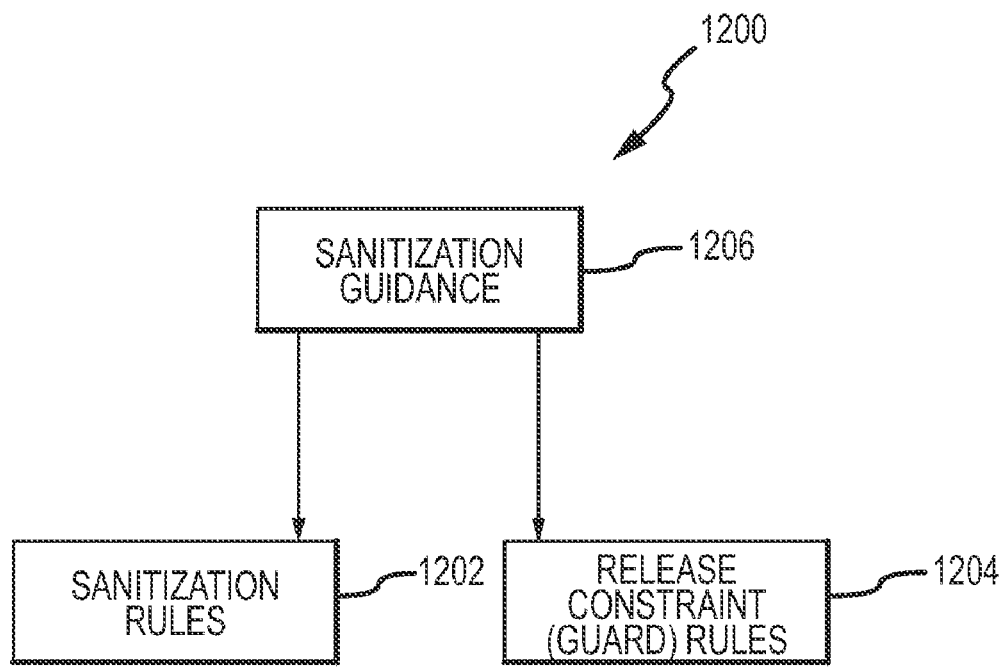
FIG. 12 illustrates the sanitization guidance system in accordance with the present invention.

The foregoing discussion has made reference to two important categories of rules. These rules are illustrated in FIG. 12. The rules 1200 include sanitization rules 1202 and release constraint rules 1204. Together these rules are controlled by sanitization guidance 1206. Each of these types of rules will be discussed in turn below.

When the message processor component of the ADS module obtains a parsed message, the message is generally processed using sanitization tasks common to all messages entering the system over a specific communications network or from a particular source. In this process, the message processor can screen the incoming data either to reduce data throughput to only messages of interest (e.g., data germane to a current area of interest), or perform a change to the data which is pertinent to all addees who will receive this message (e.g., correct the spelling of a particular field value).

The processor can then perform sanitization for specific "addees". An addee refers to an addressee or a group of addressees on a channel which has the same sanitization requirements for messages processed by the ADS module. For example, all Tomahawk ships on the same channel may be grouped under one addee name because each is only authorized to receive secret GENSER level messages. The message processor can then copy the message for each addee. A set of unique sanitization tasks, designed for each particular addee, is used to remove or replace data to satisfy security guidance required to downgrade or process the information for the particular addee. These sanitization tasks, as shown in FIG. 12, are derived directly from security guidance designed for the specific site of employment and the local security concept of operations. This guidance directs how messages processed by that site are to be sanitized for release at specific sensitivity levels.

The entire input message may be screened against a "dirty word" search task containing one or more definable tables of words or phrases or other strings which constitute a security risk. The dirty words may include code words or other classified names and/or locally prescribed dirty words which must be removed in order to properly sanitize the message.

Generally, one or more "rule" sanitization tasks have been developed by the operator to execute specific actions on fields in the message. Rules can add, replace, delete, round, adjust, copy, store or retrieve an attribute value. They can also send a message to the operator for review or delete free text in the message.

These sanitization tasks may be developed locally or imported from another system. The sequence or flow of sanitization tasks is defined by the operator and is generally under two person control, i.e., one person initiates an action and a second person approves the action. Once activated, the sanitization module handles the received messages automatically according to the plan designed by the operator.

The sanitization rules manipulate the parsed data based on a condition statement paired with an action statement; commonly called an if/then statement. If a certain condition exists in a message then the system performs a certain action. Each of these if/then statements is called a rule. Various examples of rules, as well as user interfaces for selecting, defining and implementing them, are set forth in the Parent Application. Some such types of rules include the following.

TABLE 1

| CONDITION | RULE BASED SANITIZATION ACTION |
|---|---|
| Operator defined criteria to delete a contact | Delete contact being processed |
| Operator defined criteria to delete a specific attribute | Delete specified attribute |
| Free (unformatted) text in message | Delete free text in message being processed |
| Operator defined value requiring numeric rounding | Round the value of the attribute as specified |
| Operator designates attribute whose value is to be replaced and designated attribute exists in the message | Replace the value of the attribute with the supplied value |
| Operator designates attribute | Add a new attribute containing the |

TABLE 1-continued

| CONDITION | RULE BASED SANITIZATION ACTION |
|---|---|
| whose value is to be replaced but designated attribute does not exist in the message | supplied value |
| Operator defined condition when met requires additional actions to be performed | Apply the additional rules to the contact meeting the conditions |
| Operator designates attribute whose value is to be copied to another attribute | Copy the value of the attribute to value of the designated attribute |
| Operator designates attribute whose value is to be adjusted | Adjust the value of the attribute as specified |
| Operator designates attribute whose value is to be incremented based on a previously applied value | Increment the value of the designated attribute |
| Operator designates an attribute whose value is to be stored | Store the value of a designated attribute based on a key attribute which uniquely identifies the stored attribute |
| Operator designates key attribute which identifies the stored attribute list from which the attribute value is to be retrieved | Retrieve the value of a designated attribute based on a key attribute which uniquely identifies the stored attribute list from which the attribute is to be retrieved |

Figure 14:
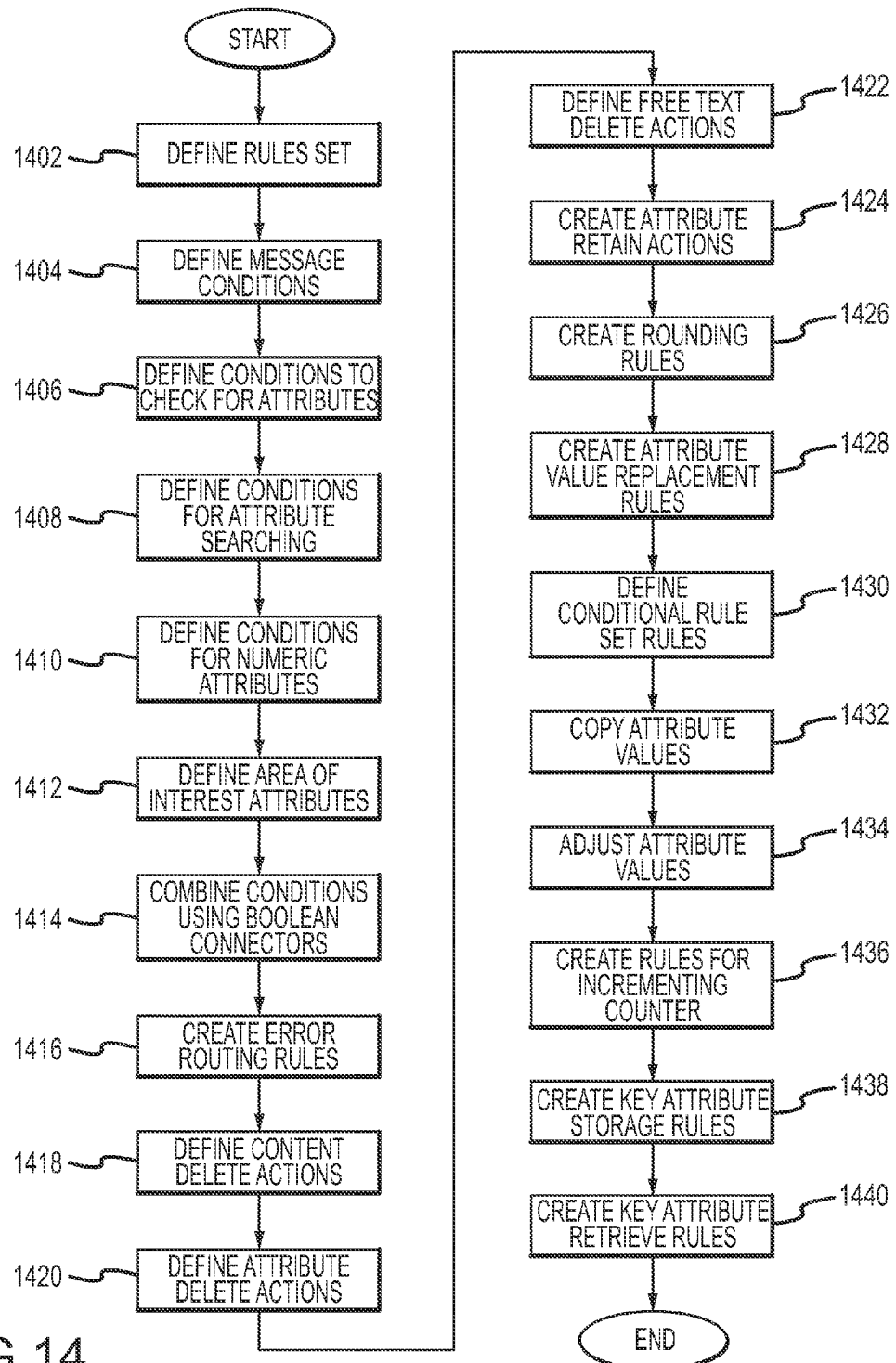
FIG. 14 is a flowchart illustrating a process for development of rules for rule based sanitization.

FIG. 14 is a flowchart showing the steps an operator may perform in the development of rules based sanitation. The associated steps are listed below:

1. Define (1402) a set of rules used to sanitize messages and their component contacts.
2. Define (1404) conditions on message-level attributes and attributes of contacts contained in the message.
3. Define (1406) conditions checking for the existence of attributes.
4. Define (1408) conditions for text or character attributes searching for the occurrence of a given string, which may include wildcards (symbols that represent any characters)
5. Define (1410) conditions for numeric attributes as a comparison to a given value using the relational operators (equal, less than, greater than) or their negations
6. Define (1412) conditions in which contact positions are within a specified Area of Interest (predefined geographic area, e.g., in terms of coordinates).
7. Combine (1414) conditions in a set using boolean logical connectors.
8. Create (1416) rule actions to route messages being processed to the Error Queue.
9. Define (1418) contact deletion actions.
10. Define (1420) attribute deletion actions, specifying the attribute to delete.
11. Define (1422) actions to delete all attributes containing free text.
12. Create (1424) rule actions which designate attributes to be retained, deleting all attributes not listed.
13. Create (1426) rule actions that specify the precision to which a specified numeric attribute (integer, floating point number, position, or time) is to be rounded.
14. Create (1428) rule actions which replace attribute values with supplied values.
15. Define (1430) rule actions which provide an additional set of rules to be conditionally performed.
16. Copy (1432) one attribute value to that of another attribute.
17. Adjust (1434) an attribute value by a supplied amount.
18. Create (1436) rule actions which increment the value of an attribute by a specified amount based on a previously defined message counter definition.
19. Create (1438) rule actions which store the value of an attribute based on the presence of an associated key attribute.
20. Create (1440) rule actions which retrieve a stored attribute value based on the presence of an associated key attribute.

In addition to rules based sanitization, the ADS module determines the classification level of the received message by reading the sensitivity labels in the message. The input and output communications channels parameters are defined by the operator according to local site security requirements, e.g., from top secret/sensitive compartmented information (TS/SCI) to top secret/NATO releaseable (TS/NATO), or from TS/SCI to secret (S). Using these definitions, the ADS module initiates internal checks and verification processes to insure data is guarded against release to unauthorized channels and addressees. Once sanitized, the message is reformatted.

The ADS module as discussed above also contains a separate Guard. The Guard contains rules, called release constraint rules (RCRs). The RCRs are defined by the operator under two person control and, again, as depicted in FIG. 12, in accordance with the same sanitization guidance which governed the development of the sanitization rules. RCRs are designed to verify that each message has been properly sanitized by the sanitization rules. The Guard also verifies that correct classification markings are present and that the message header and body format are correct. It verifies that the correct constraints on message release are in place and that the message is at the right classification level to be released to the channel and addees prior to passing the message to the output channel for transmission.

The foregoing description has included a discussion of the various MAG and ADS components and processes. Further details in this regard, as well as user guide level instructions for operation of a specific product implementation re provided in the Parent Application.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in a multi-level secure system for sanitizing a message, said method comprising the steps of:

establishing a computer-based sanitization tool for sanitizing messages based on predefined sanitization rules, wherein said multi-level secure system includes at least first and second security levels and wherein first security level users are authorized to receive sensitive information that second security level users are not authorized to receive;

first using said computer-based sanitization tool for receiving a message for potential distribution;

second operating said computer-based sanitization tool for identifying at least first and second potential recipients having first and second security clearances, respectively;

third operating said computer-based sanitization tool for sanitizing said received message to generate a first sanitized message for transmission to said first potential recipient; and fourth operating said computer-based sanitization tool for sanitizing said received message to generate a second sanitized message, different than the first sanitized message, for transmission to said second potential recipient, wherein said step of third operating comprises identifying first sensitive information within said message based on said first security clearance of said first potential recipient and protecting said first sensitive information such that said first sensitive information is not useable by said first potential recipient, and said step of fourth operating comprises identifying second sensitive information based on said second security clearance of said second potential recipient and protecting said second sensitive information such that said second sensitive information is not useable by said second potential recipient.

2. A method as set forth in claim 1, wherein said step of third operating comprises accessing storage including multiple rule sets, using a parameter associated with said first security clearance to select a first rule set, and applying said selected first rule set with respect to said message to generate said first sanitized message, and said step of fourth operating comprises accessing said storage including said multiple rule sets, using a second parameter associated with said second security clearance to select a second rule set, and applying said second rule set with respect to said message to generate said second sanitized message.

3. A method as set forth in claim 1, wherein said step of first using comprises receiving a text only message.

4. A method as set forth in claim 1, wherein said message includes a graphics portion and said step of third operating comprises protecting sensitive information within said graphics portion such that said sensitive information is not useable by said first recipient.

5. A method as set forth in claim 1, wherein said step of third operating comprises parsing said message into a number of tokens and separately analyzing each token for sensitive information.

6. A method as set forth in claim 1, wherein said step of third operating comprises identifying a first format associated with said first potential recipient and converting said first sanitized message into said first format, and said step of fourth operating comprises identifying a second format associated with said second potential recipient and converting said second sanitized message into said second format.

7. A method as set forth in claim 6, further comprising the step of providing storage including first specification information for said first format and second specification information for said second format, where said step of third operating comprises accessing said storage to obtain said first specification information and said step of fourth operating comprises accessing said storage to obtain said second specification information, wherein said storage can be used to reconfigure said sanitization tool for transmission in multiple formats without re-compiling.

8. A method for use in a multi-level secure system for sanitizing a message, said method comprising steps of:
receiving an input file that includes information associated with at least first and second security levels of the multi-level secure system, wherein a user associated with said first security level of the multi-level secure system is entitled to receive information that a user associated with said second security level of the multi-level secure system is not entitled to receive;
determining a security level associated with at least one user of the multi-level secure system to be said first security level;
determining a security level associated with at least one user of the multi-level secure system to be said second security level;
generating a first output file from the input file based on the first security level;
transferring the first output file to said at least one user with the first security level;
parsing intelligible elements from the information of the input file;
analyzing said intelligible elements to select a portion of the intelligible elements for sanitization according to the second security level;
sanitizing the information of the selected portion of the intelligible elements according to the second security level to generate a second output file for said at least one user with the second security level, wherein said second output file has a first format; and
formatting the second output file to a second format for said at least one user with the second security level; and
transferring the second output file in the second format to said at least one user with the second security level.

9. A method for use in a multi-level secure system for sanitizing a message, said method comprising the steps of:
establishing rules based logic determining a level of access to sensitive information as a function of information regarding an intended recipient of a message including at least a portion of said sensitive information, wherein different recipients are associated with different levels of access to said sensitive information, said rules based logic analyzing specific items of said sensitive information in the context of a given message relative to a selected rule set of a number of rule sets, wherein different ones of said rule sets correspond to set different levels of access to said sensitive information;
receiving, in a processing system including said rules based logic, a first message including a first item of said sensitive information;
analyzing, in said processing system, said first message to obtain recipient information regarding a first intended recipient of said first message;
based on said recipient information, accessing a first rule of a first rule set of said number of rule sets using said processing system;
applying said first rule to process said first item of sensitive information, using said processing system, so as to generate a processed first message having a difference in relation to said first message, said difference being a function of said recipient information regarding said first intended recipient;
processing the said first item of sensitive information according to the first rule, wherein said processing includes altering the first item of sensitive information or removing the first item of sensitive information;
processing the first message according to a second rule associated with a second recipient to generate a second message that differs from the first message; and
operating said processing system to cause said processed first message to be transmitted to said first intended recipient.

10. A method as set forth in claim 9, wherein processing the first message includes processing a second item of sensitive information according to the second rule, wherein said processing the second item of sensitive information includes altering the second item of sensitive information or removing the second item of sensitive information.

* * * * *